(12) United States Patent
Delgado deLeon

(10) Patent No.: US 9,714,061 B1
(45) Date of Patent: Jul. 25, 2017

(54) BICYCLE CUP HOLDER

(71) Applicant: Maria Alejandra Delgado deLeon, Denver, CO (US)

(72) Inventor: Maria Alejandra Delgado deLeon, Denver, CO (US)

( * ) Notice: Subject to any disclaimer, the term of this patent is extended or adjusted under 35 U.S.C. 154(b) by 0 days.

(21) Appl. No.: 15/157,978

(22) Filed: May 18, 2016

(51) Int. Cl.
*B62J 11/00* (2006.01)

(52) U.S. Cl.
CPC .................................... *B62J 11/00* (2013.01)

(58) Field of Classification Search
CPC ...... B62J 11/00; Y10S 224/926; B60N 3/103; B60N 3/108; A45F 3/02
See application file for complete search history.

(56) References Cited

U.S. PATENT DOCUMENTS

| | | | |
|---|---|---|---|
| 1,530,256 A | 3/1925 | Garland | |
| 2,028,566 A | 1/1936 | Seipel et al. | |
| 2,531,052 A * | 11/1950 | Kehoe | A47J 45/00 81/3.32 |
| 2,719,414 A | 10/1955 | Davis | |
| 4,379,541 A * | 4/1983 | Harkness | A47K 1/08 248/313 |
| 4,479,617 A | 10/1984 | Edwards | |
| 4,606,523 A | 8/1986 | Statz et al. | |
| 4,877,284 A * | 10/1989 | Doane | B60N 2/4666 108/46 |
| 4,928,873 A | 5/1990 | Johnson | |
| 5,102,086 A | 4/1992 | Thomason | |
| 5,285,953 A | 2/1994 | Smith | |
| 5,474,272 A * | 12/1995 | Thompson | A47C 7/68 248/311.2 |
| 5,752,687 A | 5/1998 | Lynch | |
| 5,829,726 A * | 11/1998 | Withun | B60N 3/102 224/926 |
| 5,839,710 A * | 11/1998 | Hubbard | B60N 3/102 224/926 |
| 6,264,154 B1 * | 7/2001 | Hiscox | B60N 3/101 224/560 |
| 6,505,802 B2 | 1/2003 | Fowler | |
| 6,942,131 B2 | 9/2005 | Trautman et al. | |
| 7,533,860 B2 * | 5/2009 | Somuah | B60N 3/102 206/217 |
| 8,123,092 B2 * | 2/2012 | Krulik | A45C 13/30 150/108 |
| 8,596,682 B2 * | 12/2013 | Johnson | B60K 15/067 180/69.4 |
| 9,428,313 B2 * | 8/2016 | Olsen | B65D 63/10 |
| 2003/0197104 A1 | 10/2003 | Heybl et al. | |
| 2006/0169860 A1 | 8/2006 | Altheimer | |
| 2006/0284040 A1 * | 12/2006 | Nixon | B62J 11/00 248/311.2 |

* cited by examiner

*Primary Examiner* — Corey Skurdal
(74) *Attorney, Agent, or Firm* — Holland & Hart LLP

(57) ABSTRACT

A cup holder includes a housing and a retractable strap configured to secure a cup to the housing in a deployed configuration and to at least partially retract into the housing in a stowed configuration. The cup holder may include a tensioner assembly disposed within the housing configured to retract the strap into the housing.

16 Claims, 7 Drawing Sheets

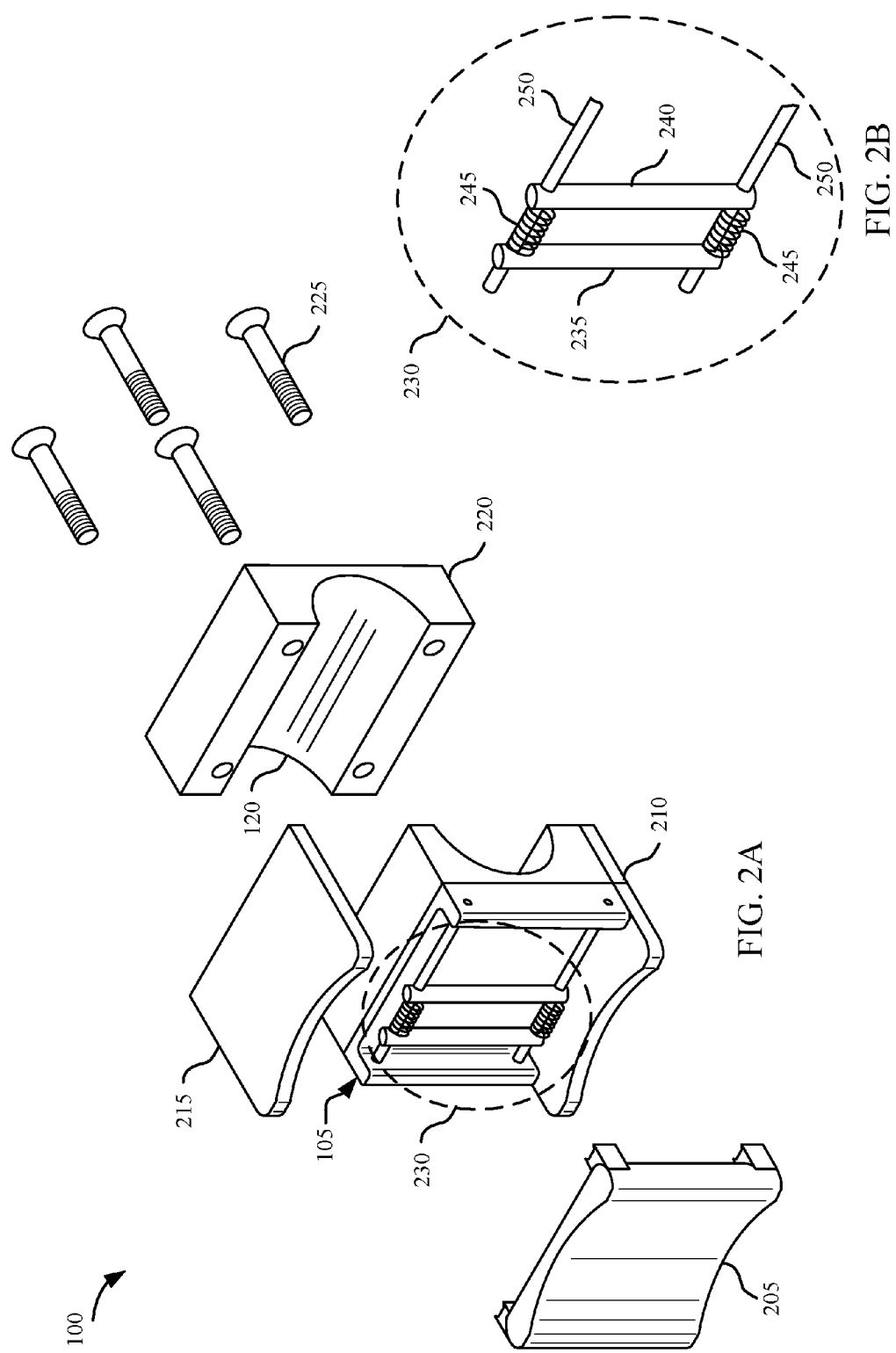

BICYCLE CUP HOLDER

BACKGROUND

The present disclosure generally relates to cup holders and more particularly to cup holders that mount to the handlebars of a bicycle, motorcycle, or the like. A typical handlebar-mounted cup holder includes a bracket for mounting to the handlebars and a cup-holder portion configured to securely hold a cup. Generally, the portion that holds the cup is cylindrical and may include a bottom for additional support.

The cylindrical portion of a typical cup holder is usually rigid and non-adjustable. Such designs limit the range of cup sizes that can be held by the cup holder. Also, the portion that holds the cup is always visible and exposed, even when a cup is not being held. This feature may be undesirable for users who wish to improve the aesthetics and aerodynamics of the cup holder while not in use.

SUMMARY

A cup holder is described that is configured to transition between stowed and deployed configurations. The cup holder may include a retractable strap that deploys from a housing of the cup holder when in use, but that retracts back into the housing when not in use. The retractable strap may accommodate a variety of cup sizes and also allows a user to reduce the profile of the cup holder while not in use.

A cup holder is described that includes a housing and a retractable strap configured to secure a cup to the housing in a deployed configuration and to at least partially retract into the housing a stowed configuration. In some examples, the cup holder also includes a tensioner assembly disposed within the housing and configured to retract the strap into the housing. The tensioner assembly may include a first rod, a second rod oriented parallel with the first rod, and at least one spring configured to urge the second rod away from the first rod The housing of the cup holder may be configured to fixedly attach to a bicycle handle bar. In some examples, the housing includes a concave front surface. The housing may also include at least one slit sized to accommodate the strap deploying from and retracting into the housing.

In certain examples, the first and second rod of the tensioner assembly are both movable with respect to each other. In other cases, the first rod is fixed and the second rod is moveable with respect to the first rod. The distance between the first and second rod may be greater in the stowed configuration than in the deployed configuration.

The strap may be coupled with the tensioner assembly in a number of configurations. In some examples, the strap is attached to the second rod of the tensioner assembly and is at least partially wrapped around the first rod. In such examples, the strap may include a first end and a second end opposite the first end, and the first end of the strap may be attached to the second rod. In some cases, the strap forms a continuous belt and the strap wraps around the second rod. The strap may be wrapped around the first rod and the second rod such that the strap at least partially overlaps itself.

In some examples, the tensioner assembly includes a first rail, a second rail oriented parallel with the first rail such that the first rod and the second rod of the tensioner assembly are each slidably coupled to the first rail and the second rail. The tensioner assembly may also include a first compression spring disposed along the first rail and a second compression spring disposed along the second rail.

The strap of the cup holder may deploy and retract into the housing in a number of ways. In some cases, the strap forms a continuous loop with a front face of the housing when the cup holder is in the stowed configuration. In such cases, the cup holder may be transitioned into a deployed configuration by pulling the strap away from the front face of the housing. In other examples, the strap is completely disposed within the housing when the cup holder is in the stowed configuration. In such cases, the cup holder may be transitioned into the deployed configuration by pulling the strap from a first side of the housing and latching the strap to a second side of the housing opposite the first side. In some examples, the strap includes a reinforcing element configured to urge the strap into an arcuate shape when the cup holder is in the deployed configuration.

A cup holder is described, including a housing, a means for securing a cup to the housing, and a means for retracting the means for securing the cup into the housing.

Certain embodiments of the present disclosure may include some, all, or none of the above advantages or features. One or more other technical advantages or features may be readily apparent to those skilled in the art from the figures, descriptions, and claims included herein. Moreover, while specific advantages or features have been enumerated above, various embodiments may include all, some, or none of the enumerated advantages or features.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2A is an exploded view of a cup holder in accordance with various aspects of the present disclosure;

FIG. 2B is a detailed view of a tensioner assembly in accordance with various aspects of the present disclosure;

DETAILED DESCRIPTION

The present disclosure generally describes various features of a cup holder configured to transition between a stowed and deployed configuration. A cup holder may include a retractable feature that holds a cup when in the deployed configuration but that partially or completely retracts into a housing of the cup holder when the cup holder is in the stowed configuration. The retractable feature may include a flexible element such as a strap, belt, band, or the like. The strap may wrap around at least a portion of the cup and snuggly hold the cup against the housing of the cup holder when the cup holder is in the deployed configuration and may retract or collapse when the cup holder is in the stowed configuration. The retractable feature of the cup holder allows a user to reduce the profile of the cup holder when not in use. The retractable feature may also accommodate various cup sizes, thereby increasing the utility of the cup holder. Embodiments of the present disclosure are now described in detail with reference to the drawings.

Figure 1:
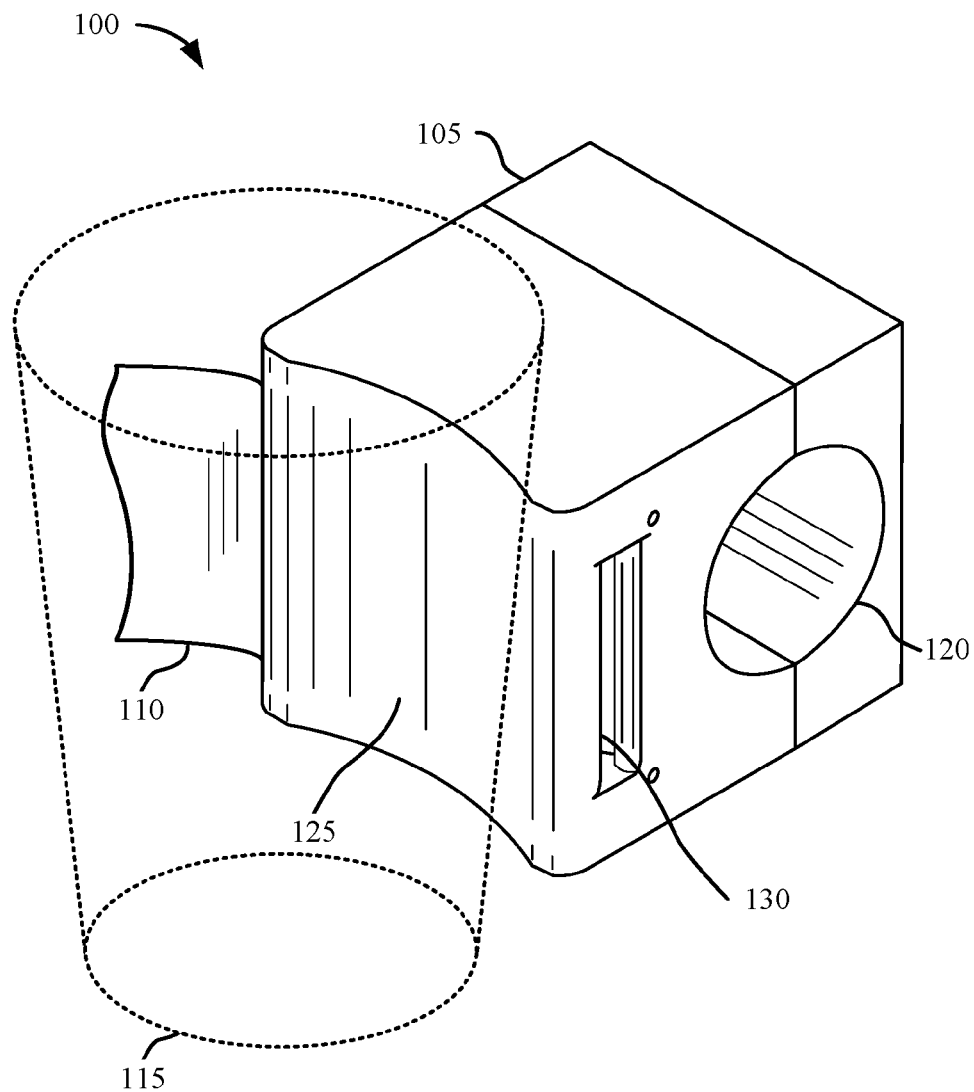
FIG. 1 is a perspective view of a cup holder in accordance with various aspects of the present disclosure.

FIG. 1 shows a perspective view of a cup holder 100 in accordance with aspects of the present disclosure. The cup holder 100 generally includes a housing 105 and a strap 110 configured to at least partially wrap around and securely hold a cup 115 against the housing 105. The strap 110 is generally configured to deploy from and retract back into the housing 105. As such, when the cup holder 100 is not being used to hold a cup 115, the strap 110 may be retracted partially or completely back into the housing 105 thereby reducing the profile of the cup holder 100. As used herein, the cup holder 100 is in a deployed configuration when the strap 110 is deployed from the housing 105 to hold a cup 115 against the housing 105, and the cup holder 100 is in a stowed configuration when the strap 110 is retracted back into the housing 105 such that it cannot hold a cup 115.

The housing 105 may be made from a variety of materials, including polymeric materials, metallic materials, or combinations thereof. In general, the materials of the housing 105 should be durable and weather proof. The housing 105 may be a cube as shown, or may instead be a rectangular cuboid, a cylinder, a sphere, or any combination of these shapes. The front face 125 of the housing 105 may be contoured to conform to the curved or tapered wall of the cup 115. For example, the front face 125 may include a concaved arcuate surface as shown. Additionally or alternatively, the front face 125 may be tapered from top to bottom such that the radius of the arcuate surface is greater at the top of the housing 105 than at the bottom of the housing 105 to match the tapered reduction in diameter from top to bottom of the cup 115 as shown. In certain examples, the front face 125 may include a rubberized or similar surface configured to enhance the grip between the front face 125 and the cup 115.

The strap 110 is generally made from a flexible and relatively thin material. The strap 110 may be made from a variety of materials including rip-stop nylon, nylon, polyester, plastics, metals, metallic meshes, silicon, polymeric or other flexible materials, fabric, or combinations thereof. As described in more detail below, the strap 110 may at least partially wrap around itself in an overlapping manner within the housing 105. As such, the strap 110 may be made from a material with a relatively low coefficient of friction to allow the strap 110 to slide over itself. Additionally or alternatively, the strap 110 may be coated with a low-friction film or spray.

The strap 110 is generally configured to deploy from and retract back into the housing 105 through one or more slits 130 on the sides of the housing 105. In the deployed configuration, the strap 110 is at least partially deployed from the housing 105 and securely holds a cup 115 to the housing 105, whereas in the stowed configuration, the strap 110 at least partially retracts back into the housing 105. As described in more detail below, the cup holder 100 may include a tensioner assembly within the housing 105 that generally pulls on the strap 110 to snuggly secure the cup 115 to the housing 105 when in a deployed configuration and to retract the strap 110 back into the housing 105 when in a stowed configuration.

The cup holder 100 also includes a handlebar mount 120 configured to securely attach the cup holder 100 to the handlebars or any other portion of a bicycle frame. The handlebar mount 120 may be integrated into the housing 105 of the cup holder 100 or may include one or more separate pieces that securely attach to the housing 105. The handlebar mount 120 may be adjustable to accommodate handlebars of different sizes and may include tightening features such as screws to securely mount the cup holder 100 to a handlebar. The inner surface of the handlebar mount 120 may be roughened or include a rubberized or similar surface to enhance the grip between the handlebar mount 120 and the handlebars.

FIG. 2A shows an exploded view of the cup holder 100 in accordance with certain aspects of the present disclosure. The housing 105 may include one or more subcomponents such as a front portion 205, central body 210, a top portion 215, and a back portion 220. It should be understood that the various subcomponents of the cup holder 100 are shown for illustrative purposes, and that the housing 105 may include more or less components assembled in a variety of configurations.

The back portion 220 and the back side of the central body 210 may include semi-cylindrical cutouts that form the handlebar mount 120. To attach the cup holder 100 to a handlebar, the central body 210 and the back portion 220 may be joined together around the handle bar in the desired location and then tightly secured together with fasteners 225. In some examples, the inner surface of the handlebar mount 120 includes rubber or some other similar surface to enhance the grip between the handlebars and the handlebar mount 120.

The cup holder 100 may also include a tensioner assembly 230 (shown in detail view in FIG. 2B) that is disposed within the housing 105. In general, the tensioner assembly 230 is configured to apply tension to the strap 110 (not shown here for clarity) to retract the strap 110 back into the housing 105. The tensioner assembly 230 may include a first rod 235, a second rod 240, and at least one spring 245 configured to urge the second rod 240 away from the first rod 235. The first rod 235 and the second rod 240 may be oriented parallel to each other and may be slidably mounted onto two rails 250 that allow the first rod 235 and the second rod 240 to both move with respect to each other. The first and second rods 235, 240 may include through-holes at their ends with diameters sufficient to accommodate the rails 250. In some embodiments, one of the rods 235, 240 is fixed while the other rod is moveable along the two rails 250. The rails 250 may be fixedly mounted to the walls of the housing 105 within the central body 210. The rods 235, 240 and the rails 250 may be made from any suitable material such as aluminum or polymeric materials.

The spring 245 may be a compression spring mounted coaxially along a rail 250 between the first rod 235 and the second rod 240 and configured to push the two rods away from each other. As shown, two springs 245 may be used to increase the expansion force. Although compression springs mounted along the rails 250 are illustrated and described, it should be appreciated that any type of elastic element arranged in any orientation that is configured to urge the two rods 235, 240 away from each other may be used.

As described in more detail below, the strap 110 (not shown here for clarity) may be wrapped around one or both of the rods 235, 240 in an overlapping manner. As such, as the first rod 235 moves away from the second rod 240, the length of the strap 110 overlapping itself increases. This increase in the length of overlap of the strap 110 within the housing 105 results in a reduction of the length of the strap 110 outside the housing 105. Accordingly, as the first rod 235 moves away from the second rod 240, the strap 110 is retracted back into the housing 105. Similarly, as the strap 110 is deployed from the housing 105 (e.g., pulled by a user), the length of overlapping strap 110 within the housing 105 decreases causing one or both of the rods 235, 240 to move closer together. Because the one or more springs 245 are naturally urging the two rods 235, 240 away from each other, the tensioner assembly 230 naturally applies tension to the strap 110. Various ways of wrapping the strap 110 around the tensioner assembly 230 are described in more detail below.

Figure 3A:
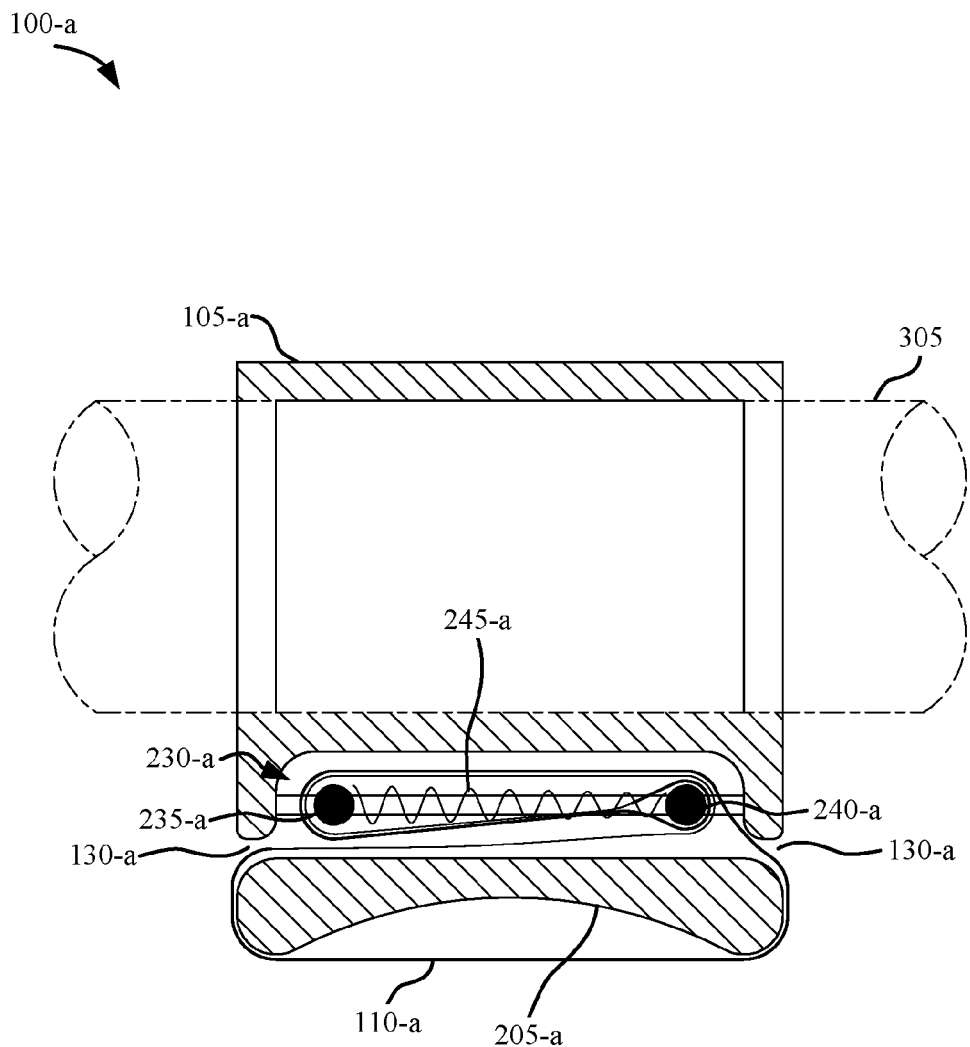
FIG. 3A is a cross-sectional top view of a cup holder in a stowed configuration in accordance with various aspects of the present disclosure.

FIG. 3A shows a cross-sectional top view of a cup holder 100-*a* in a stowed configuration in accordance with aspects of the present disclosure. Cup holder 100-*a* may be an example of the cup holder 100 described with reference to FIGS. 1-2. The cross section is taken approximately halfway between the top and bottom of the housing 105-*a*. With this view, the strap 110-*a* is shown wrapping around the tensioner assembly 230-*a*, which includes a first rod 235-*a*, a second rod 240-*a*, and one or more springs 245-*a*. In the embodiment shown in FIG. 3A, the two ends of the strap 110-*a* are joined together to form a continuous belt.

The strap 110-*a* is mounted to the tensioner assembly 230-*a* by looping one end of the belt around the second rod 240-*a* much like a belt would be mounted to a pulley or gear. The belt formed by the strap 110-*a* is then collapsed down such that the belt forms a double-ply strap 110-*a*. The double-ply strap 110-*a* is then wrapped around the first rod 235-*a* and then at least partially back around the second rod 240-*a* as shown. The strap 110-*a* may be wrapped around the two rods 235-*a*, 240-*a* one or more times. The number of times the strap 110-*a* is wrapped around the two rods 235-*a*, 240-*a* depends upon the total length of the strap 110-*a* and the desired length of strap 110 outside of the housing 105-*a* in both the deployed and stowed configurations. The end of the belt opposite the end looped around the second rod 240-*a* is opened back up (i.e., from a double ply strap configuration back to a belt configuration) and exits the housing 105-*a* through slits 130-*a*. This end of the belt formed by strap 110-*a* wraps around the front portion 205-*a* of the housing 105-*a*.

In this example, the one or more springs 245-*a* are configured to push rod 235-*a* away from rod 240-*a*. As such, the tensioner assembly 230-*a* applies a constant tension to the strap 110-*a* to retract it back into the housing 105-*a*. This tension force results in the portion of the strap 110-*a* exposed from the housing 105-*a* being taught across the front surface 205-*a* of the housing 105-*a* as shown. Also, the distance between the first rod 235-*a* and the second rod 240-*a* is at its maximum when the cup holder 100-*a* in the stowed configuration as illustrated in FIG. 3A.

Figure 3B:
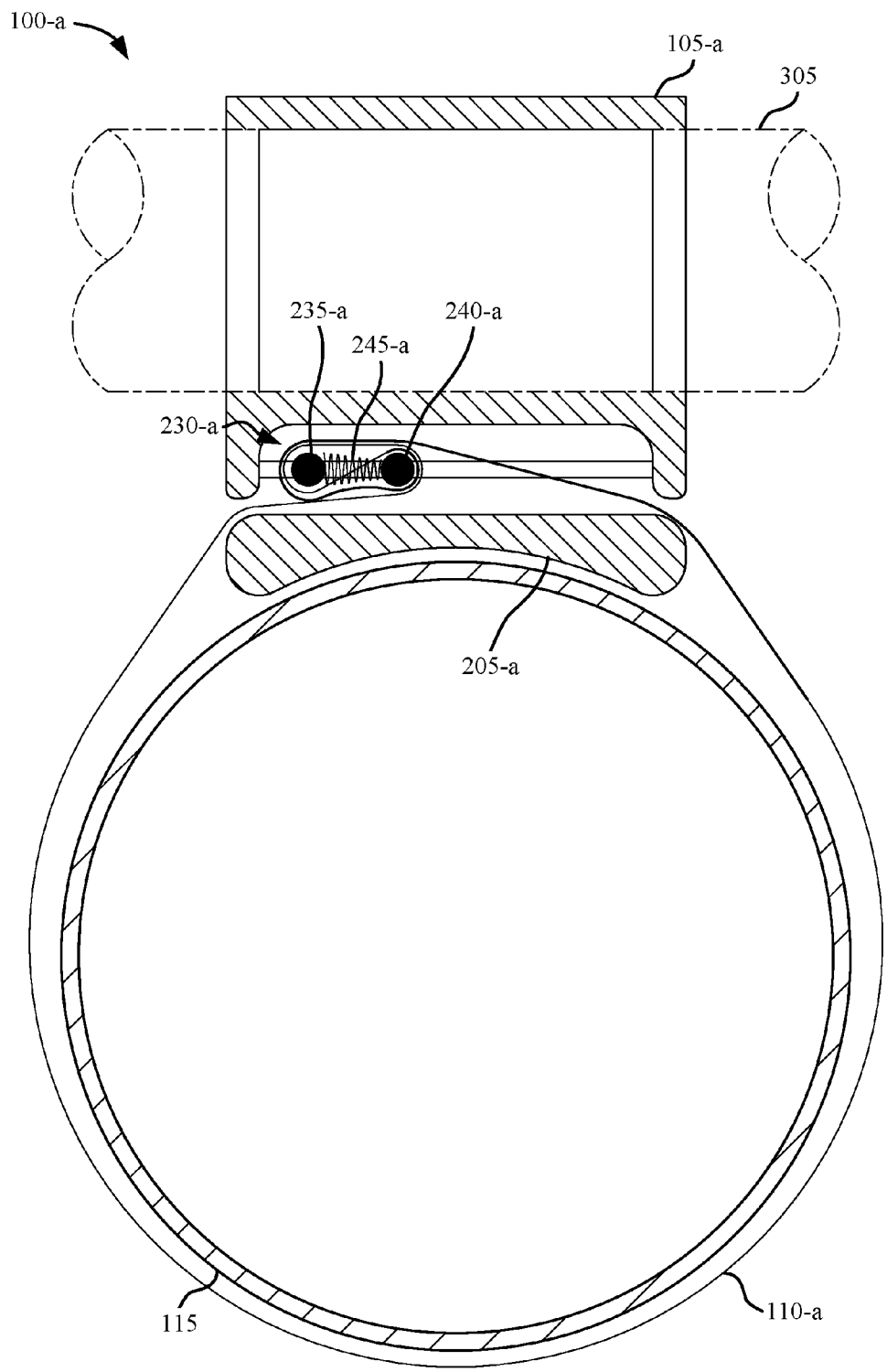
FIG. 3B is a cross-sectional top view of a cup holder in a deployed configuration in accordance with various aspects of the present disclosure.

FIG. 3B shows a cross-sectional top view of the cup holder 100-*a* of FIG. 3A in a deployed configuration in accordance with aspects of the present disclosure. To transition from the stowed configuration of FIG. 3A to the deployed configuration of FIG. 3B, a user may pull on the portion of the strap 110-*a* that is outside of the housing 105-*a*. As the strap 110-*a* is pulled away from the front face 205-*a*, the rods 235-*a*, 240-*a* move towards each other and the amount of strap 110-*a* that is overlapping itself around the two rods 235-*a*, 240-*a* decreases. The strap 110-*a* is pulled until there is enough slack to fit a cup 115 between the strap 110-*a* and the front portion 205-*a* of the housing 105-*a*. When the user releases the strap 110-*a*, the tensioner assembly 230-*a* will retract the strap 110-*a* back into the housing 105-*a* until the strap 110-*a* snuggly secures the cup 115 to the housing 105-*a*. It may be appreciated that this feature allows the cup holder 100-*a* to accommodate a variety of cup sizes because the tensioner assembly 230-*a* will take up any remaining slack in the strap 110-*a*.

To transition the cup holder 100-*a* back into a stowed configuration, the user removes the cup 115 and releases the strap 110-*a*. The tensioner assembly 230-*a* will then pull on the strap 110-*a* until all the slack is taken up and the strap 110-*a* will return to the position illustrated in FIG. 3A. It may also be appreciated that the total length of the strap 110-*a*, the tension force caused by the tensioner assembly 230-*a*, and the maximum and minimum distances between the two rods 235-*a*, 240-*a* may all be adjusted to accommodate a variety of cup sizes with varying levels of tension. For example, regarding the tension force desired, it may be appreciated that the force should be great enough to securely hold the cup 115 to the front face 205-*a* of the housing 105-*a*, but not so great that the cup 115 is squeezed too tightly, which may result in the lid of the cup 115 popping off. The tension force may be tailored by using stronger or weaker, or fewer or more springs 245-*a*. In some examples, the tensioner assembly 230-*a* may be adjustable by including adjustable-force springs so that a user can modify the tension force (e.g., by tightening or loosening a screw) based on the type of cup 115 being used. As discussed above, various modifications to the housing 105-*a* and/or to the strap 110-*a* may be made to increase the gripping force between the cup 115 and the cup holder 100-*a*, such as adding roughened or rubberized surfaces to the housing 105-*a* and/or the strap 110-*a*.

Figure 4A:
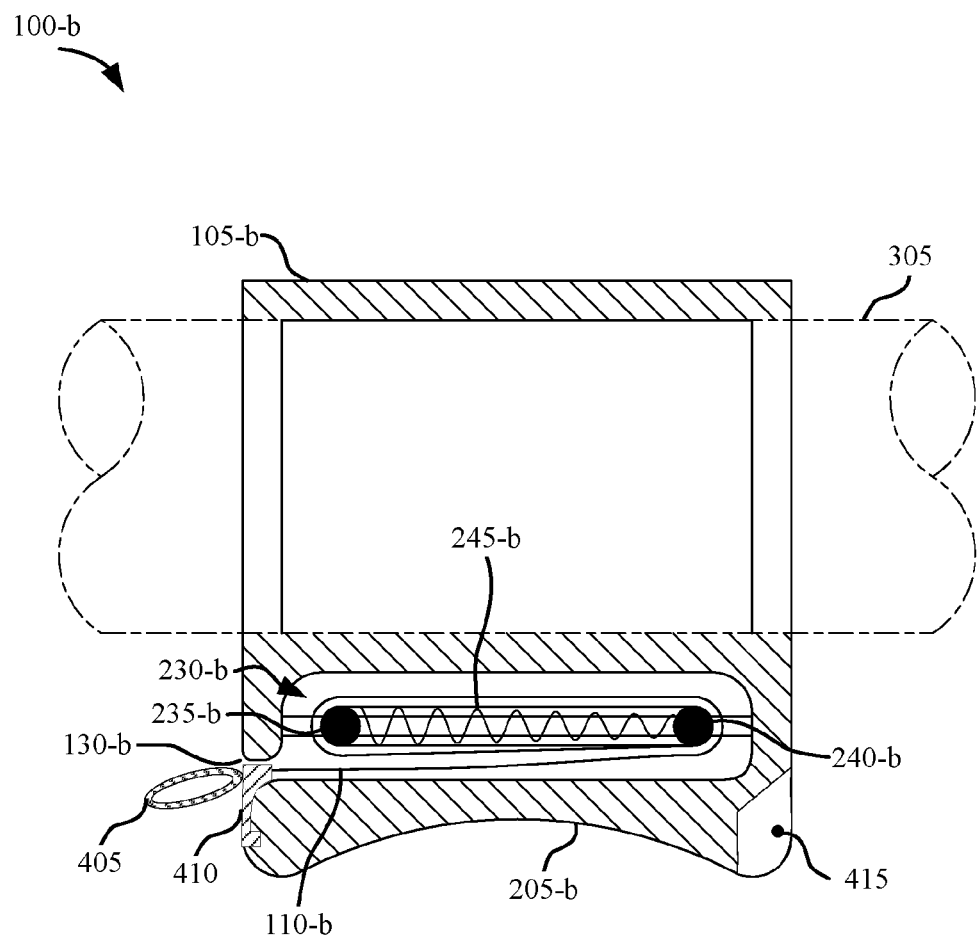
FIG. 4A is a cross-sectional top view of a cup holder in a stowed configuration in accordance with various aspects of the present disclosure.

FIG. 4A shows a cross-sectional top view of a cup holder 100-*b* in a stowed configuration in accordance with aspects of the present disclosure. The cup holder 100-*b* may be an example of the cup holder 100 described with reference to FIGS. 1-2. As shown, the strap 110-*b* wraps around the tensioner assembly 230-*b*, which includes a first rod 235-*b*, a second rod 240-*b*, and one or more springs 245-*b*. Unlike the belt configuration described with reference to FIG. 3A-3B, the strap 110-*b* includes a first end and a second end that is unattached to the first end. The strap 110-*b* is mounted to the tensioner assembly 230-*b* by fixing one end of the strap 110-*b* to the second rod 240-*b* and wrapping the opposite end of the strap 110-*b* around the first rod 235-*b* and then at least partially back around the second rod 240-*b*. The number of times the strap 110-*b* is wrapped around the two rods 235-*b*, 240-*b* depends upon the total length of the strap 110-*b* and the desired length of strap 110-*b* outside of the housing 105-*b* in both the deployed and stowed configurations. The free end of the strap 110-*b* then exits the housing 105-b through a slit 130-b in the housing 105-b. Unlike the belt configuration described with reference to FIG. 3A-3B, the strap 110-b only exits the housing 105-b through a single slit.

A pull loop 405 may be attached to the free end of the strap 110-b. Also, a hook 410 may be attached to the free end of the strap 110-b, which removably attaches to the post 415 (or latch or similar feature) on the opposite side of the housing 105-b as described in more detail below. The housing 105-b may include a recessed feature that accommodates the hook 410 such that the hook 410 is flush with the outside wall of the housing 105-b when the cup holder 105-b is in the stowed configuration. The tensioner assembly 230-b is configured to apply a tension force to the strap 110-b to retract the strap 110-b back into the housing 105-b. However, the hook 410 prevents the strap 110-b from being retracted through the slit 130-b.

Figure 4B:
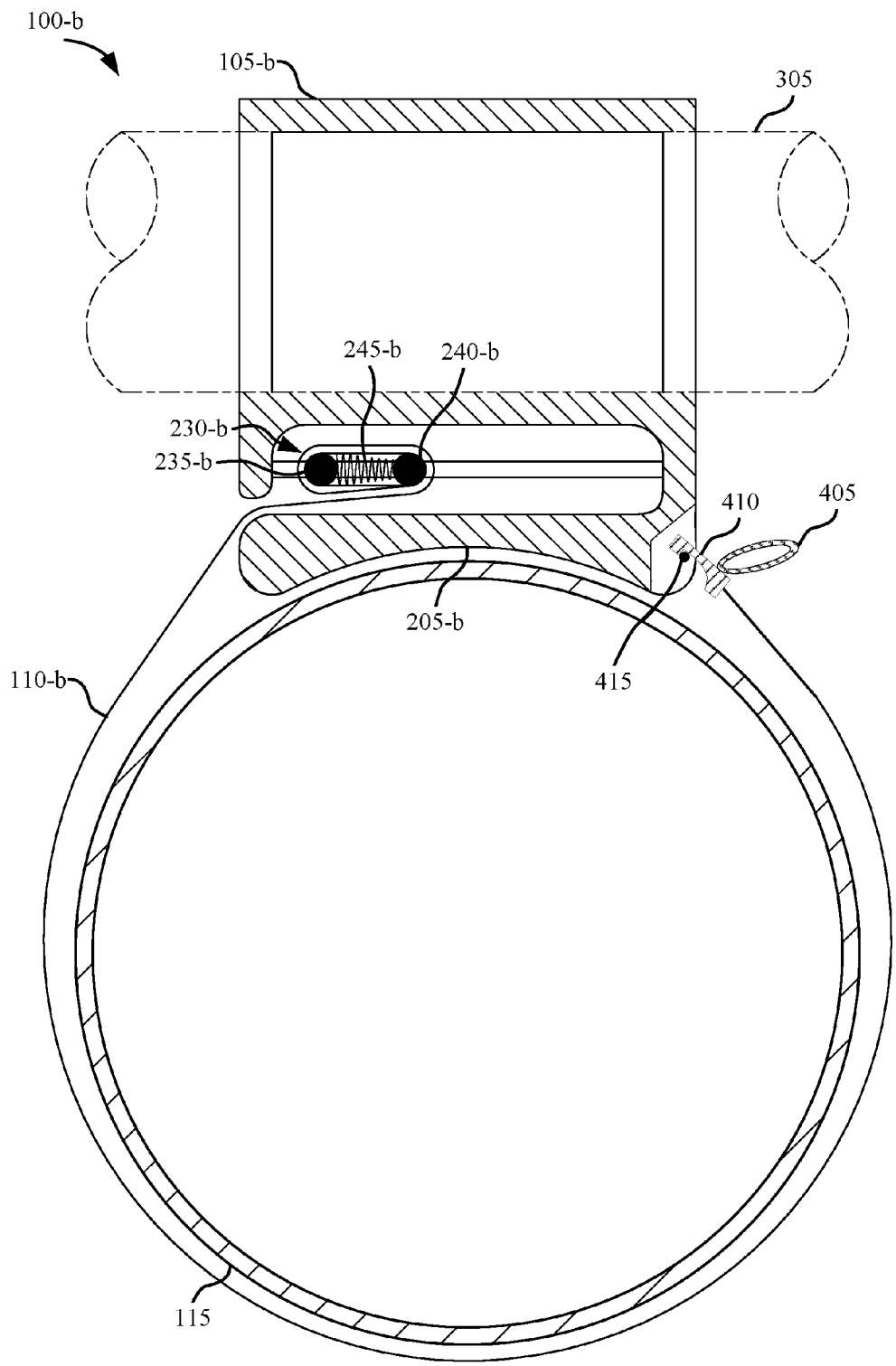
FIG. 4B is a cross-sectional top view of a cup holder in a deployed configuration in accordance with various aspects of the present disclosure.

FIG. 4B shows a cross-sectional top view of the cup holder 100-b of FIG. 4A in a deployed configuration in accordance with aspects of the present disclosure. To transition from the stowed configuration of FIG. 4A to the deployed configuration of FIG. 4B, a user may pull on the pull loop 405. As the strap 110-b is pulled from the housing 105-b, the rods 235-b, 240-b move towards each other and the amount of strap 110-b that is overlapping itself around the two rods 235-b, 240-b decreases. The strap 110-b is pulled until it wraps around the cup 115 and the hook 410 engages with the post 415 on the opposite side of the housing 105-b as the strap 110-b started. When the user releases the strap 110-b, the tensioner assembly 230-b will apply tension to the strap 110-b to snuggly secure the cup 115 to the housing 105-b.

To transition the cup holder 100-b back into the stowed configuration, a user may unlatch the hook 410 from the post 415 and remove the cup 115. Upon releasing the strap 110-b, the tensioner assembly 230-b will retract the strap 110-b back into the housing 105-b until the strap 110-b returns to the position illustrated in FIG. 4A.

Figure 5:
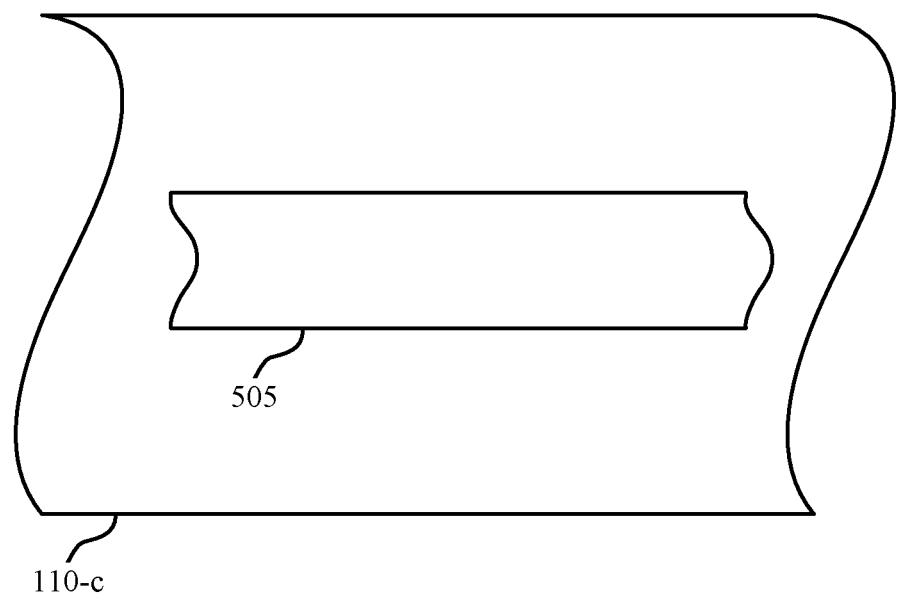
FIG. 5 is a detailed view of a strap of a cup holder in accordance with various aspects of the present disclosure.

FIG. 5 shows a detailed view of a portion of a strap 110-c of a cup holder 100 in accordance with aspects of the present disclosure. The strap 110-c may be used with any of the cup holders 100 described with reference to any of the previous figures. Strap 110-c includes one or more reinforcement members 505 made from plastic, metal, or other semi rigid materials that are either attached to a surface of or are embedded within the strap 110-c. The reinforcement member 505 is configured to provide some rigidity to the strap 110-c to assist the otherwise flexible strap 110-c to conform to an arcuate shape. The one or more reinforcement members 505 may be oriented horizontally as shown in FIG. 5, or they may instead be oriented vertically or at some other angle. In some examples, multiple reinforcement members may be overlaid in a pattern such as a crosshatch to provide rigidity to the strap 110-c.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. For example, it should be appreciated that the features of the cup holder described herein are not limited for use with bicycles, but may also be used with other types of vehicles such as cars, motorcycles, snowmobiles, ATVs, or boats. The cup holder may also be used outside the context of vehicles such as with a stroller or lawnmower, or may instead be mounted to a desk, table, or counter top. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A cup holder, comprising:
   a housing;
   a retractable strap configured to secure a cup to the housing in a deployed configuration and to at least partially retract into the housing in a stowed configuration; and
   a tensioner assembly disposed within the housing and configured to retract the strap into the housing, wherein the tensioner assembly comprises:
      a first rod;
      a second rod oriented parallel with the first rod; and
      at least one spring configured to urge the second rod away from the first rod.

2. The cup holder of claim 1, wherein the first rod and second rod are both movable with respect to each other.

3. The cup holder of claim 1, wherein the first rod is fixed and the second rod is moveable with respect to the first rod.

4. The cup holder of claim 1, wherein the distance between the first rod and the second rod is greater in the stowed configuration than in the deployed configuration.

5. The cup holder of claim 1, wherein the strap is attached to the second rod and at least partially wrapped around the first rod.

6. The cup holder of claim 5, wherein the strap comprises a first end and a second end opposite the first end, and wherein the first end of the strap is attached to the second rod.

7. The cup holder of claim 5, wherein the strap forms a continuous belt, and wherein the strap wraps around the second rod.

8. The cup holder of claim 1, wherein the strap is wrapped around the first rod and the second rod such that the strap at least partially overlaps itself.

9. The cup holder of claim 1, wherein the tensioner assembly further comprises:
   a first rail;
   a second rail oriented parallel with the first rail, wherein the first rod and the second rod are each slidably coupled to the first rail and the second rail;
   a first compression spring disposed along the first rail; and
   a second compression spring disposed along the second rail.

10. The cup holder of claim 1, wherein the strap forms a continuous loop with a front face of the housing when the cup holder is in the stowed configuration.

11. The cup holder of claim 10, wherein the cup holder is transitioned into a deployed configuration by pulling the strap away from the front face of the housing.

12. The cup holder of claim 1, wherein the strap comprises a reinforcing element configured to urge the strap into an arcuate shape when the cup holder is in the deployed configuration.

13. The cup holder of claim 1, wherein the housing is configured to fixedly attach to a bicycle handlebar.

14. The cup holder of claim 1, wherein the housing comprises a concave front surface.

15. The cup holder of claim 1, wherein the housing comprises at least one slit sized to accommodate the strap deploying from and retracting into the housing.

16. A cup holder, comprising:
a housing;
a means for securing a cup to the housing; and
a means for retracting the means for securing the cup into the housing, wherein the means for retracting the means for securing the cup into the housing comprises:
a first rod;
a second rod oriented parallel with the first rod; and
at least one spring configured to urge the second rod away from the first rod.

* * * * *